Figure 1:
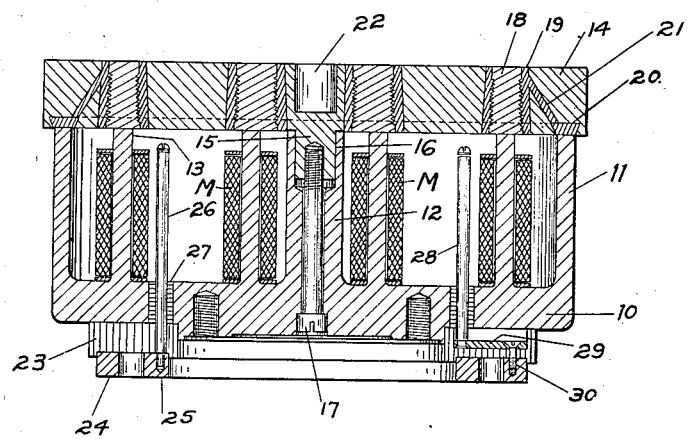

W. S. GRIFFITH.
MAGNETIC CHUCK.
APPLICATION FILED APR. 27, 1914.

1,146,867.

Patented July 20, 1915.
2 SHEETS—SHEET 1.

Witnesses:

Inventor
W. S. Griffith
by attorneys
Southgate + Southgate

W. S. GRIFFITH.
MAGNETIC CHUCK.
APPLICATION FILED APR. 27, 1914.

1,146,867.

Patented July 20, 1915.
2 SHEETS—SHEET 2.

Witnesses:

Inventor
W. S. Griffith
by Attorneys
Southgate & Southgate

UNITED STATES PATENT OFFICE.

WINFRED S. GRIFFITH, OF WORCESTER, MASSACHUSETTS, ASSIGNOR TO HEALD MACHINE COMPANY, OF WORCESTER, MASSACHUSETTS, A CORPORATION OF MASSACHUSETTS.

MAGNETIC CHUCK.

1,146,867.  Specification of Letters Patent.  Patented July 20, 1915.

Application filed April 27, 1914. Serial No. 834,650.

*To all whom it may concern:*

Be it known that I, WINFRED S. GRIFFITH, a citizen of the United States, residing at Worcester, in the county of Worcester and State of Massachusetts, have invented a new and useful Magnetic Chuck, of which the following is a specification.

This invention relates to a magnetic chuck of the type commonly used to hold the work in position on lathes, planers, milling and grinding machines, and other types of metal working machinery.

It is the object of my present invention to improve the details of construction of such magnetic chucks, thereby increasing their efficiency and also simplifying the construction and decreasing the cost of manufacture of the several parts.

With these objects in view my invention comprises certain devices, arrangements and combinations of parts which will be hereinafter described and more particularly pointed out in the appended claims.

A preferred form of the invention is shown in the drawings in which—

Figure 4:
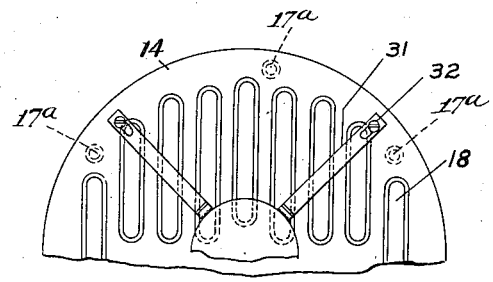
Figure 5:
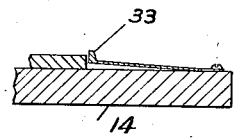
Figure 6:
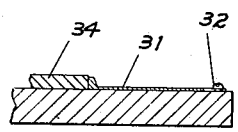
Figure 3:
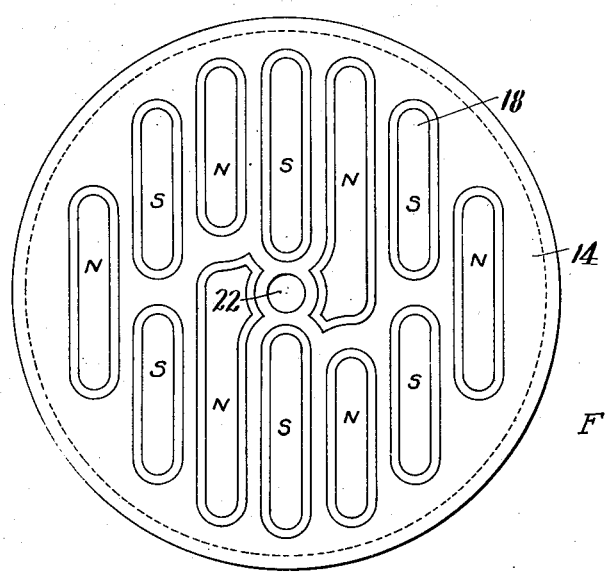
Figure 2:
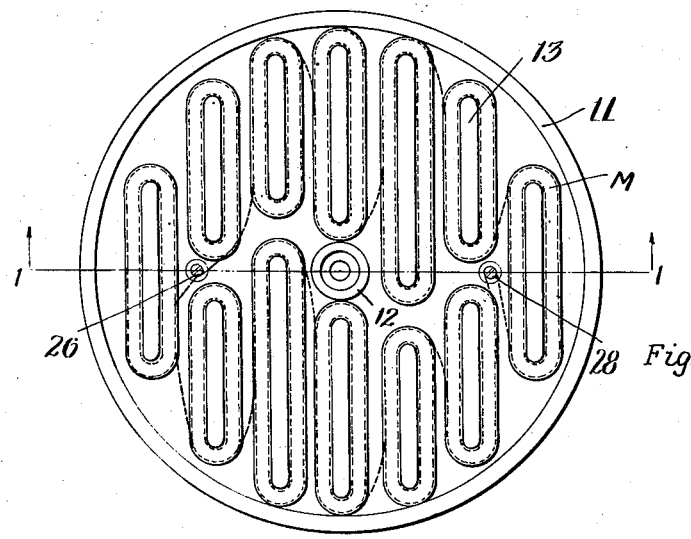

Figure 1 is a sectional elevation taken on the line 1—1 of Fig. 2; Fig. 2 is a top plan view of the chuck shown in Fig. 1 with the face plate removed; Fig. 3 is a top plan view of the face plate; Fig. 4 is a partial plan view of a face plate similar to that shown in Fig. 3, with work-holding devices secured thereto, and Figs. 5 and 6 are detail sectional views showing one of the work-holding devices in inoperative and operative positions respectively.

Referring to Fig. 1, my improved chuck comprises a chuck body 10 having an upwardly extending shell 11 around its outer edge. This chuck body may be of the form which is best adapted to the work for which a particular chuck is designed, the chuck shown in the drawings being of cylindrical form. Within the shell 11 there is a central post 12 and a plurality of magnet cores 13. In the preferred form which is shown in the drawings, the shell 11, central post 12, and magnet cores 13 are formed integrally with the chuck body, although I do not wish to be limited to this specific construction.

A face plate 14 is provided, having a cylindrical projection 15 adapted to fit within a corresponding recess 16 in the central post 12. A stud 17 passing upwardly through the body of the chuck is threaded into the projection 15 and thus serves to hold the face plate firmly upon the central post and upon the shell 11. Additional binding screws 17ª (indicated in dotted lines in Fig. 4) may be located around the circumference of the chuck body, extending upwardly therethrough, and being threaded into the face plate, if the size of the chuck renders their use advisable. A cylindrical recess 22 is provided in the working face of the face plate, this recess being useful for centering purposes when the chuck is used upon a lathe. A plurality of pole pieces 18 are mounted in recesses in the face plate 14, being secured therein and magnetically insulated therefrom by a layer of relatively soft non-magnetic material 19. I have found that the metal commonly called "expansion metal," from its property of expanding upon cooling, is a suitable material for this purpose.

In assembling the face plate the pole pieces are held in a suitably constructed jig so that they are properly spaced from the walls of the recess in the plate 14, the melted expansion metal being thereafter poured into the spaces surrounding the pole pieces. It is desirable that the sides of the pole pieces should be roughened or serrated as shown in Fig. 1, so that the holding power of the expansion metal may be increased. Upon its underside the face plate 14 is provided with an annular recess 20 which is also filled with expansion metal. As this recess is upon the lower side of the plate it is convenient to provide a connecting recess 21 through which the metal may flow from the upper side while it is filling the spaces around the pole pieces. This annular ring of relatively soft metal upon the lower side of the face plate serves several useful purposes. In the manufacture of these face plates it is customary to grind both faces of the plate to a plane surface after the pole pieces are inserted. As the expansion metal offers less resistance to the grinding wheel than the material of which the face plate and the pole pieces are formed, the annular ring will be cut away to a slightly greater depth than the other portions of the face plate. When the parts are assembled as shown in Fig. 1, this will concentrate the pressure exerted by the screws 17 upon the magnet cores 13, thus insuring a close contact of the cores with the pole pieces before the expansion metal ring is seated upon the shell 11. A further advantage of this metal ring lies in the fact that its relative softness enables it to form a more closely fitting joint with the shell 11, thereby preventing the possible admission of moisture to the magnet coils M. These coils, as shown in Figs. 1 and 2, are of substantially rectangular formation, and closely surround the cores 13. They are so wound and connected that each alternate core is oppositely magnetized, so that adjacent pole pieces in contact with the upper ends of the cores will be of opposite polarity, as indicated by the letters N and S in Fig. 3.

In the circular chucks which are designed particularly for use upon lathes and similar machines, I provide the contact device shown in section in Fig. 1. This device comprises a ring 23 of insulating material secured to the bottom of the chuck body, having mounted thereon two concentric rings 24 and 25 of brass or other suitable metal. A terminal post 26 is supported in the chuck body by an insulating bushing 27 and extends downward through the ring 23 into the inner contact ring 25. A similar terminal post 28 extends downward through the chuck body and, where the arrangement of the coils will permit, passes directly through the ring 23 into the outer contact ring 24 in the same manner as does the post 26. Where the position of the outer magnet coil prevents this arrangement, I provide a brass plate 29 which is radially arranged in a recess in the insulating ring 23 and which has one end secured to the post 28 and the opposite end connected to the ring 24, as by a screw 30. As the voltage at which these chucks are operated varies in different establishments, I arrange the magnet coils in two or more groups, the coils in each group being arranged in series, and the groups themselves being arranged in series or in parallel according to the voltage at which they are to be operated.

In the chuck shown in the drawings, the coils are arranged in two groups, which would be connected in parallel as shown at the usual voltage of 110 volts, and in series for 220 volts. For larger chucks in which a greater number of coils is used, the number of groups will be increased, so that the proper number of coils will be included in series in each group.

The terminal posts 26 and 28 provide convenient conductors to the contact rings and by changing the connections from the groups to these posts the arrangement of the coils may be readily varied. Any suitable device may be provided for transmitting current to the contact rings.

It has been heretofore customary in circular chucks to group the pole pieces in radial relation about the center of the chuck. With this arrangement the poles have been close together at their inner ends and widely separated at their outer ends, the holding power of the chuck per unit of area thus decreasing as the diameter increased. To avoid this disadvantage, I have provided the arrangement of poles shown in the drawings in which all of the pole pieces are substantially equal in width throughout their length, the pole pieces being arranged in parallel relation and so proportioned in length that their outer ends shall all be substantially equally spaced from the periphery of the chuck.

In order to increase the holding power of the chuck for very small articles placed near the center of the chuck I arrange two of the pole pieces in radial relation to the center and place a pair of pole pieces of opposite polarity upon each side of the radial pole pieces. I furthermore extend one pole piece of each of the last named pairs beyond the center line of the chuck and provide these pole pieces with lateral projections on their inner sides, the inner faces of these projections and the ends of the radial pole pieces being substantially equally spaced from the center. In the preferred form I also form the inner faces of the lateral projections concentric with the center. With this arrangement I am enabled to greatly increase the holding power of the chuck in the immediate vicinity of the center. With the pole pieces magnetized in such a way that each alternate pole piece is of opposite polarity it will be seen that the path of the magnet lines of force lies between adjacent pole pieces, and that the shell 11 and the central part 12 form no essential part of the magnetic circuit. Furthermore the face plate 14 is not essential to the completion of the circuit and the chuck will operate equally well when for any reason it is found desirable to construct the plate 14 of nonmagnetic material.

In Figs. 4, 5 and 6 I have shown an improved device for centering and holding small articles upon a chuck, particularly if such articles are of non-magnetic material. This holding device comprises a plurality of flat spring arms 31 adjustably secured to the face plate by screws 32. At their inner ends these arms are provided with upwardly projecting work-holding members 33, which may be roughened or serrated upon their working faces if so desired. The arms 31 are formed of magnetic material and stand normally in the position shown in Fig. 5. As soon as the current is turned on, the magnetized pole pieces will draw the arms strongly toward the face plate, bringing them to the position shown in Fig. 6, and causing them to firmly grip the work which is indicated at 34. It is obvious that if desired these arms could be made rigid and pivoted to supports adjustably mounted upon the face plate.

Having thus described my invention it will be obvious that many changes and modifications can be made therein by one skilled in the art without departing from the spirit and scope of my invention as set forth in the claims, and I do not wish to be limited to the specific details herein disclosed, but

What I do claim is:—

1. A circular magnetic chuck having, in combination, a chuck body, a circular face plate, and a plurality of separate pole pieces mounted in said face plate and of opposite polarities when in use, said pole pieces being of substantially equal width throughout their length, but of different relative lengths, and being all secured in said face plate in substantially parallel relation but magnetically insulated therefrom, the outer ends of said pole pieces being at substantially equal distances from the periphery of the face plate, and the pole pieces of one polarity alternating with the pole pieces of the opposite polarity.

2. A magnetic chuck having, in combination, a chuck body having an outer shell, a face plate, and a plurality of pole pieces mounted in said plate but magnetically insulated therefrom, said face plate having a ring of relatively soft metal inserted in its lower face and forming the bearing surface upon the shell of the chuck body.

3. A circular magnetic chuck having, in combination, a face plate, and a plurality of parallel pole pieces mounted in said face plate but magnetically insulated therefrom, one pair of said pole pieces being radial to the center of said face plate, and an additional pair being each mounted parallel to one of the radial poles and having a projection upon its inner side concentric with the center of the chuck, whereby the ends of the two pairs of poles surround and are spaced substantially equally from the center of the chuck.

4. A magnetic chuck having, in combination, a chuck body, having a plurality of magnet cores supported therein, coils for said cores, a circular face plate, and a plurality of pole pieces mounted in but magnetically insulated from said face plate, one pair of said pole pieces being radial to the center of said plate, and two additional pairs being parallel to the radial poles, one pair on each side thereof, one pole of each of the last named pairs being extended beyond the center line and having a lateral projection on its inner side, with its inner face and the inner ends of the radial poles substantially equally spaced from the center.

5. A magnetic chuck having, in combination, a face plate, and a plurality of work holding arms secured at one end to said face plate, said arms being formed of magnetic material and having their operative ends normally spaced from said plate.

6. A magnetic chuck having, in combination, a face plate, and a plurality of work holding spring arms adjustably secured to the face of said plate, said arms being formed of magnetic material.

7. A magnetic chuck having, in combination, a face plate, a plurality of flat spring arms formed of magnetic material adjustably secured by one end to said face plate, and work holding members mounted on the free ends of said arms, and spaced from the plate when in normal position.

In testimony whereof I have hereunto set my hand, in the presence of two subscribing witnesses.

WINFRED S. GRIFFITH.

Witnesses:
C. FORREST WESSON,
CATHARINE I. HARTNETT.